(12) United States Patent
McCutcheon et al.

(10) Patent No.: US 8,146,726 B2
(45) Date of Patent: Apr. 3, 2012

(54) POSITIVE CLUTCH PLATE SEPARATOR SYSTEM

(75) Inventors: Steven E. McCutcheon, Fort Wayne, IN (US); Tim B. Allmandinger, Roanoke, IN (US)

(73) Assignee: Eaton Corporation, Cleveland, OH (US)

(*) Notice: Subject to any disclaimer, the term of this patent is extended or adjusted under 35 U.S.C. 154(b) by 656 days.

(21) Appl. No.: 12/326,042

(22) Filed: Dec. 1, 2008

(65) Prior Publication Data
US 2010/0133056 A1 Jun. 3, 2010

(51) Int. Cl.
*F16D 13/50* (2006.01)
(52) U.S. Cl. .................................... 192/70.28
(58) Field of Classification Search .............. 192/70.18, 192/70.28, 89.24
See application file for complete search history.

(56) References Cited

U.S. PATENT DOCUMENTS

| | | |
|---|---|---|
| 1,974,390 A | 9/1934 | Eason |
| 2,385,517 A | 9/1945 | Hunt |
| 3,086,634 A * | 4/1963 | Reed .................. 192/70.252 |
| 3,981,381 A | 9/1976 | Nosek |
| 4,437,555 A * | 3/1984 | Tomm et al. ............ 192/70.21 |
| 4,751,990 A | 6/1988 | Schraut et al. |
| 4,848,555 A | 7/1989 | Riese et al. |
| 5,950,786 A | 9/1999 | Mahoney |
| 6,039,161 A | 3/2000 | Tanaka et al. |
| 6,070,708 A | 6/2000 | Fukuda et al. |
| 6,866,132 B2 | 3/2005 | Gochenour et al. |

FOREIGN PATENT DOCUMENTS

| | | |
|---|---|---|
| DE | 2610007 A1 | 9/1976 |
| DE | 10218365 A1 | 10/2002 |
| GB | 2087001 A | 5/1982 |

OTHER PUBLICATIONS

International Search Report for PCT/IB2009/007603.
English abstract for DE-10218365, Oct. 10, 2002.

* cited by examiner

*Primary Examiner* — David D Le
*Assistant Examiner* — David J Hlavka
(74) *Attorney, Agent, or Firm* — Rader, Fishman & Grauer PLLC

(57) ABSTRACT

A torque transmitting apparatus includes a cover portion generally defined by a first axis, and a flywheel coupled to the cover portion for rotation therewith. The flywheel is restrained from axial movement relative to the cover portion. The apparatus also includes a pressure plate coupled to the cover portion for rotation therewith, wherein the pressure plate is axially moveable relative to the cover portion. The apparatus also includes an intermediate plate coupled to the cover portion for rotation therewith. The intermediate plate is axially moveable relative to the cover portion and the pressure plate. The apparatus further includes a first clutch disk at least partially interposed between the pressure plate and the intermediate plate, a second clutch disk at least partially interposed between the flywheel and the intermediate plate, an axially acting biasing element for exerting an axial force between the pressure plate and the intermediate plate, and a support member extending through the biasing element.

17 Claims, 16 Drawing Sheets

POSITIVE CLUTCH PLATE SEPARATOR SYSTEM

TECHNICAL FIELD

The disclosure generally relates to dual-disk clutches for transmitting torque in automobiles.

BACKGROUND

Friction clutches for use in transmitting rotational torque between a motor vehicle engine and a transmission are well known. One known friction clutch design includes two friction disks, a pressure plate, an intermediate plate, and a clutch cover mounted for rotation about a common axis. The clutch disks, pressure plate and intermediate plate are axially moveable relative to each other so that the pressure plate may be moved relative to the cover to press the two friction disks and the interposed intermediate plate axially against an engine flywheel. A series of drive straps, each generally including one or more resilient elements that are layered to form a leaf spring, are placed around the peripheries of the intermediate plate and pressure plate to provide a biasing force against the plates. During engagement of the clutch, the intermediate plate, pressure plate and friction disks are pressed against the engine flywheel, such that rotation of the flywheel causes rotation of the friction disks. During disengagement of the clutch, the drive straps bias the intermediate plate and pressure plate in a direction away from the flywheel to separate the intermediate plate and pressure plate from the friction disks.

With many conventional friction clutches, the axial movement of the intermediate plate may be uncontrolled during engagement and disengagement of the clutch. That is, simultaneous engagement of the intermediate plate and the pressure plate with the friction disks and simultaneous disengagement of the friction disks from the interposed intermediate plate may not occur as desired. If the friction disks are engaged sequentially rather than simultaneously, the friction material on one friction disk may be consumed more rapidly than the friction material on the other friction disk, thereby reducing the useful life of the clutch.

To ensure virtually simultaneous engagement of the friction disks, several designs have been proposed that force the travel of the intermediate plate to closely coincide with pressure plate travel. One known design incorporates a mechanism that includes a separator element bolted to the radially outer side of the intermediate plate and a lever attached to the mid-point of the drive straps that bias the pressure plate. Engagement of the separator element with the lever limits axial movement of the intermediate plate to approximately half of the axial movement of the pressure plate during engagement and disengagement of the clutch. Accordingly, the friction disks are engaged by the intermediate plate and pressure plate nearly simultaneous, providing substantially uniform wear of the friction disks and a smooth engagement of the clutch.

Further, the previous mechanisms to achieve simultaneous engagement have not been adjustable. Accordingly, there exists a need for a simplified device that can be easily and cost effectively affixed to a clutch to achieve the desired control of intermediate plate travel relative to the pressure plate travel.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1:
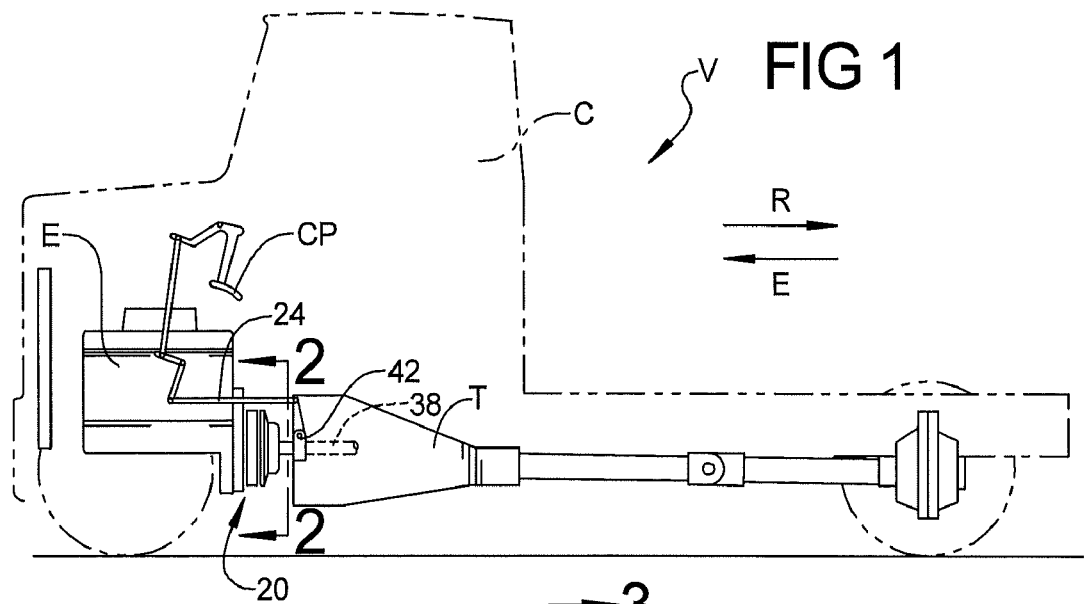
FIG. 1 is an environmental view illustrating a clutch mounted in a heavy duty vehicle.
Figure 2:
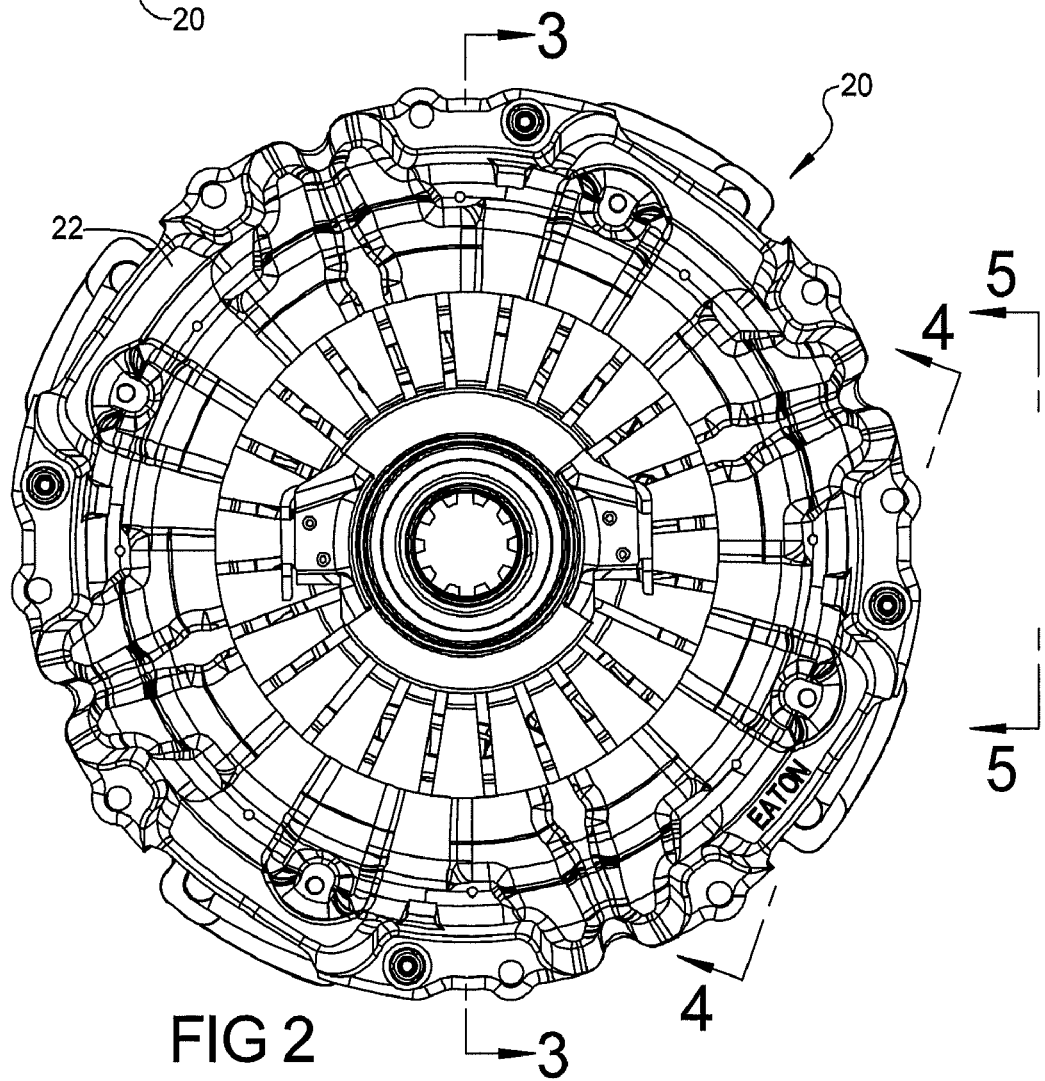
FIG. 2 is a view of the clutch, taken generally along line 2-2 of FIG. 1.

FIG. 1 illustrates a vehicle V having a cab C heavy duty clutch 20 which selectively transmits torque from an engine flywheel 24 to a driven shaft 38 of a vehicle transmission T. The flywheel 24 is the driving member providing torque which is selectively transmitted to the transmission T. A standard clutch release assembly 42 is employed for affecting clutch 20 disengagement from the flywheel 24. Such movement of release assembly R is achieved by depression of a clutch pedal CP in a vehicle cab C, or by an electronic clutch assembly (ECA). The clutch pedal CP may be mechanically linked to release assembly 42. A full stroke of pedal CP will fully disengage the clutch 20, moving release assembly 42 to an extreme right position (in the direction of the arrow R).

Figure 3:
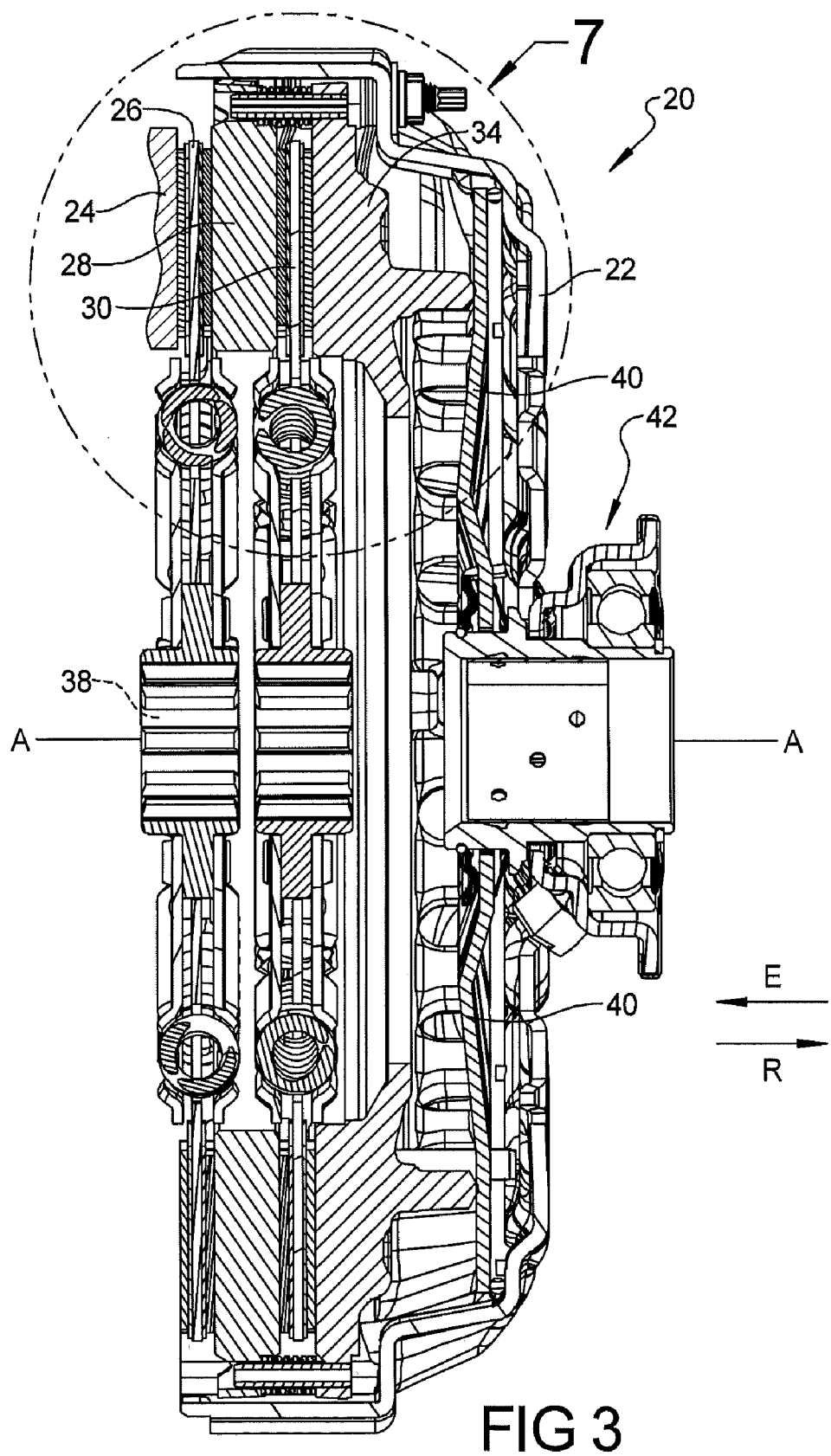
FIG. 3 is a sectional view of the clutch, taken generally along line 3-3 of FIG. 2.

Referring to FIGS. 2-6, the clutch 20 is illustrated as a double-disk friction clutch generally defined by an axis A-A (FIG. 3). The clutch 20 includes a cover 22 that is detachably secured to the flywheel 24 of the internal combustion engine E. Between the cover 22 and the flywheel 24 is disposed a first friction disk 26 adjacent the flywheel 24 and an the intermediate plate 28 adjacent the first friction disk 26. A second friction disk 30 is disposed adjacent a transmission-facing side 32 of the intermediate plate 28 and a the pressure plate 34 is disposed adjacent a transmission-facing side 36 of second friction disk 30. First and second friction disks 26, 30 are secured for rotation on the transmission input shaft 38, but are axially moveable in relation thereto.

The intermediate plate 28 and the pressure plate 34 are secured for rotation with the cover 22 and, like friction disks 26 and 30, are axially moveable in relation thereto. In the illustrated exemplary embodiment, the pressure plate 34 abuts a diaphragm spring 40 that moveably connects the pressure plate 34 to a release mechanism 42. The release mechanism 42 is selectively controlled by a vehicle operator to engage and disengage the clutch 20. However, it will be appreciated that the clutch 20 can be used with a variety of clamp-load generating release mechanisms besides a diaphragm spring. One well known example is the use of a plurality of levers and compression springs. Another alternative is a centrifugally actuated clutch having both an intermediate plate and a pressure plate. In the centrifugally actuated clutch, the clamping load is generated by pivoted weights, which swing radially outwardly with rotation of the clutch assembly.

Figure 4:
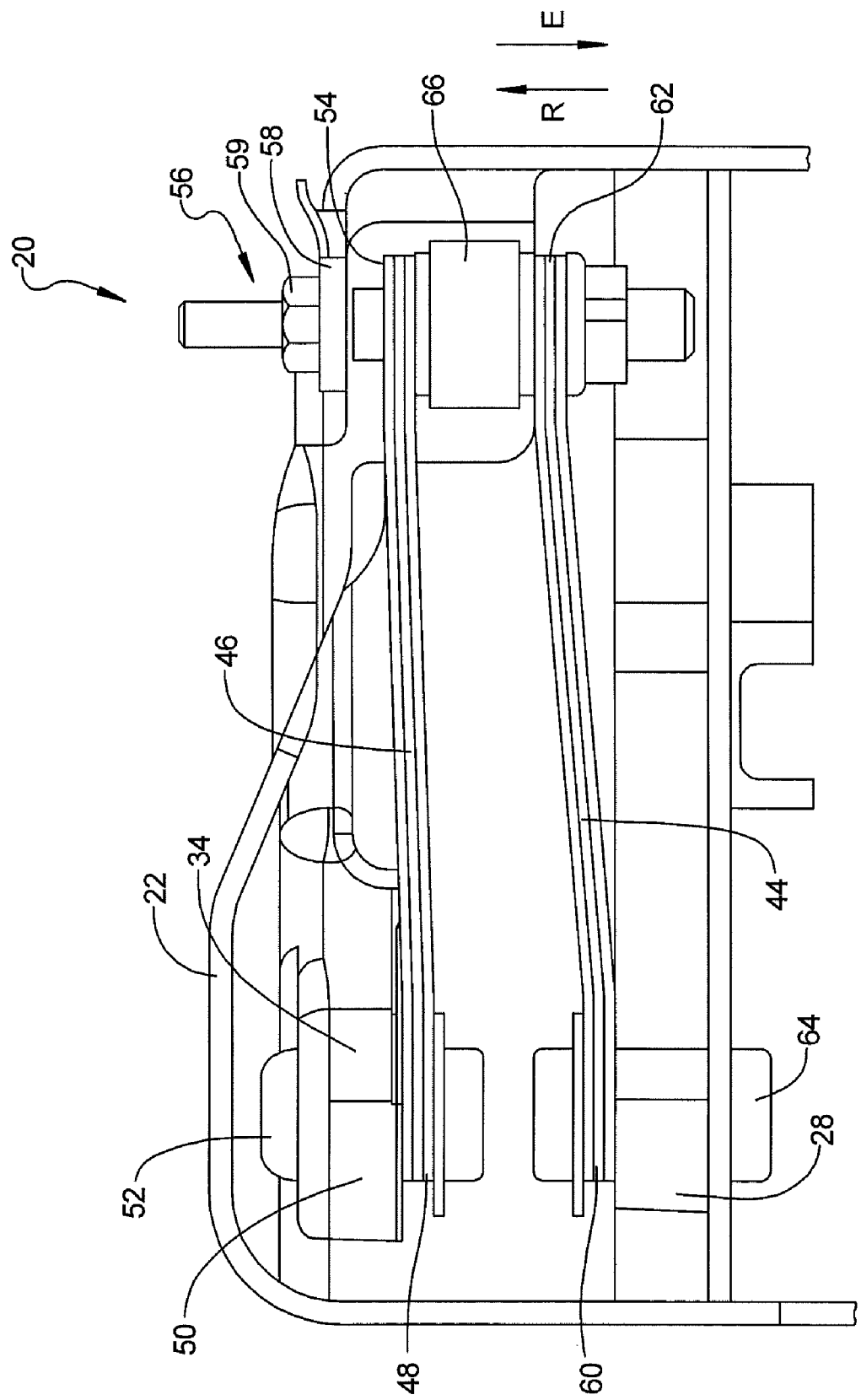
FIG. 4 is a sectional view of the clutch, taken generally along line 4-4 of FIG. 2.
Figure 5:
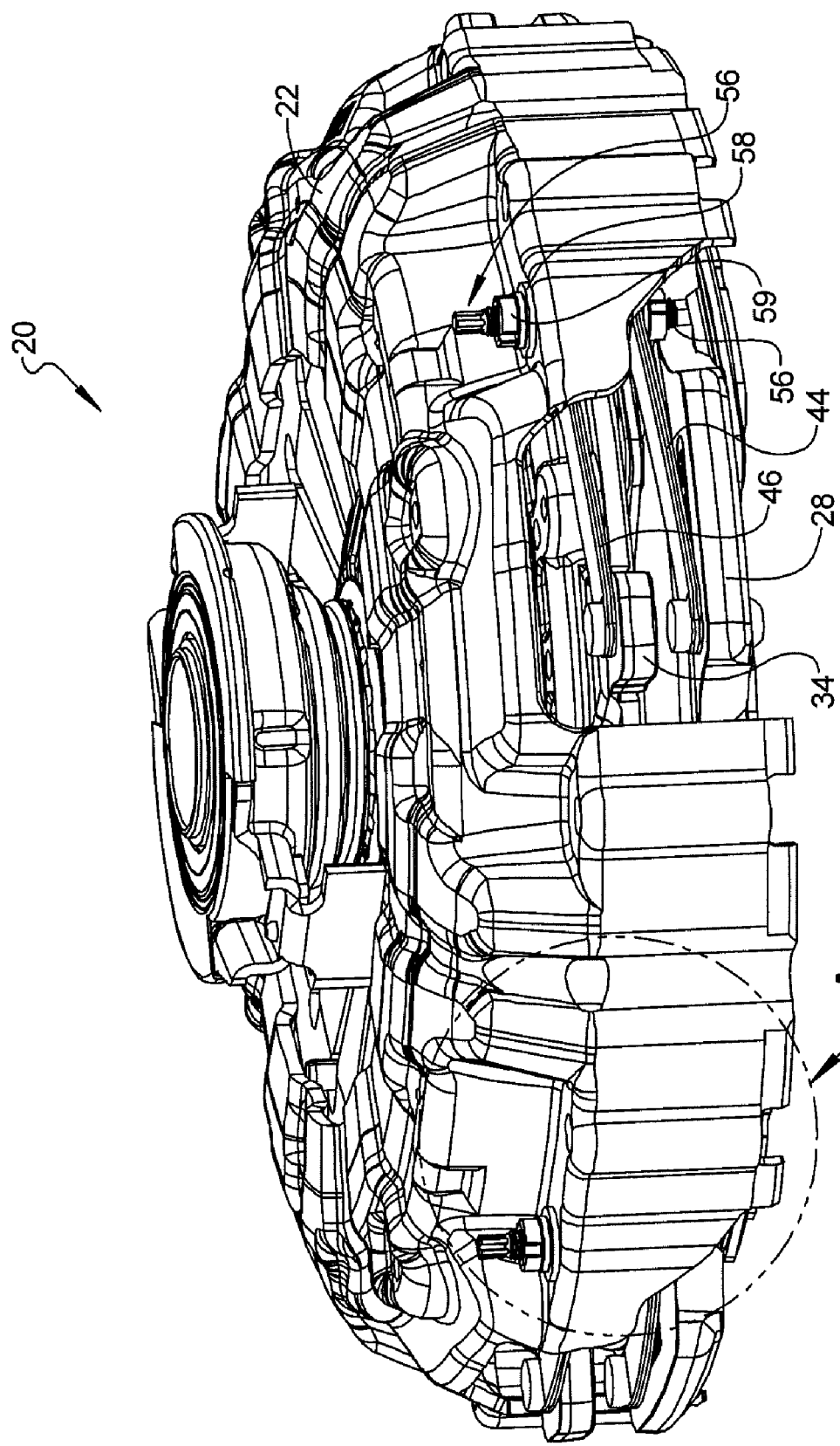
FIG. 5 is a perspective view of the clutch, taken generally along the view of line 5-5 of FIG. 2.

Referring now specifically to FIGS. 4 and 5, the intermediate plate 28 and the pressure plate 34 are moveably connected to the cover 22 by first and second drive straps 44 and 46, respectively. The drive straps 44, 46 preferably include a plurality of resilient elements that are layered together to form a leaf spring, as is known. The first drive strap 44 provides a force on the intermediate plate 28 for biasing the intermediate plate 28 in a direction toward the pressure plate 34. Similarly, the second drive strap 46 provides a force against the pressure plate 34 to ensure that the pressure plate 34 is in continuous contact with the diaphragm spring 40. In return, the diaphragm spring 40 applies a clamping force against the pressure plate 34 when engagement of the clutch 20 is desired. While FIGS. 4 and 5 show only one pair of drive straps 44, 46 for each of the intermediate plate 28 and the pressure plate 34, respectively, a plurality of the drive straps 44 and 46 are distributed about the peripheries of the intermediate plate 28 and the pressure plate 34 in the exemplary embodiment illustrated.

Referring again to FIG. 4, a first end 48 of the second drive strap 46 is fixedly secured to a flange portion 50 of the pressure plate 34 by a fastener 52, such as a rivet or the like. A second end 54 of the second drive strap 46 is removably connected to the cover 22 by a drive strap fastener 56, such as a threaded bolt or the like. A washer 58 may be disposed between a head 59 of the fastener 56 and the second drive strap 46 to ensure adequate contact pressure is distributed over second end 54 of the second drive strap 46.

With continuing reference to FIG. 4, a first end 60 of the first drive strap 44 is fixedly secured to the intermediate plate 28 by a fastener 64, such as a rivet or the like, while a second end 62 of the first drive strap 44 is removably connected to the cover 22. In the embodiment illustrated, the first drive strap 44 is preferably attached to the cover 22 by the fastener 56, which may be a threaded bolt or the like. A generally cylindrical sleeve 66 extends between the second end 62 of the first drive strap 44 and the second end 54 of the second drive strap 46. Accordingly, the first drive strap 44 and the second drive strap 46 are fixedly attached to the cover 22 with a single fastener 56, although the first drive strap 44 and the second drive strap 46 may not be fixedly attached to the cover 22 with a single fastener.

Figure 6:
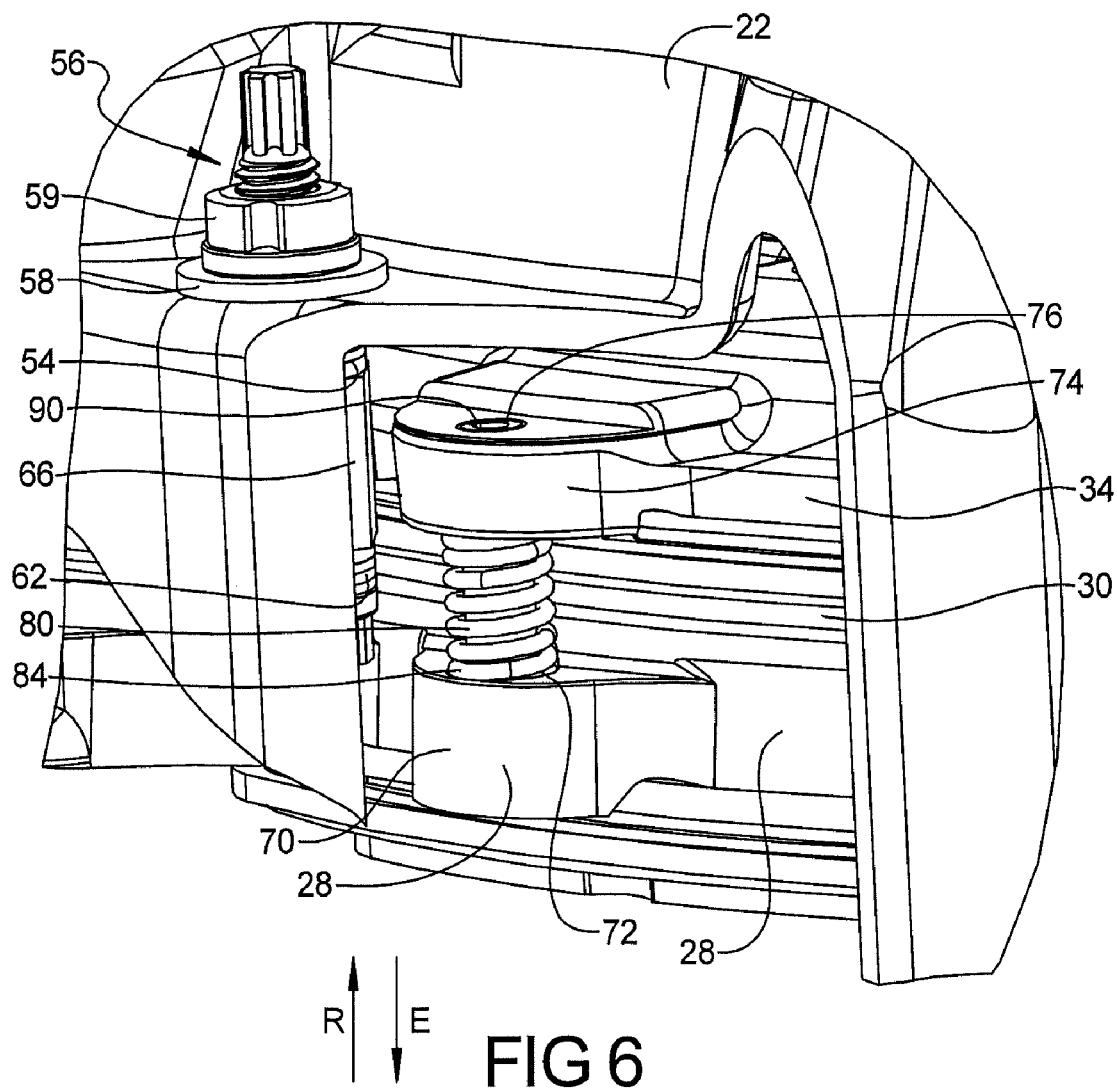
FIG. 6 is an enlarged, partial cut-away view of portion A of FIG. 5.
Figure 7:
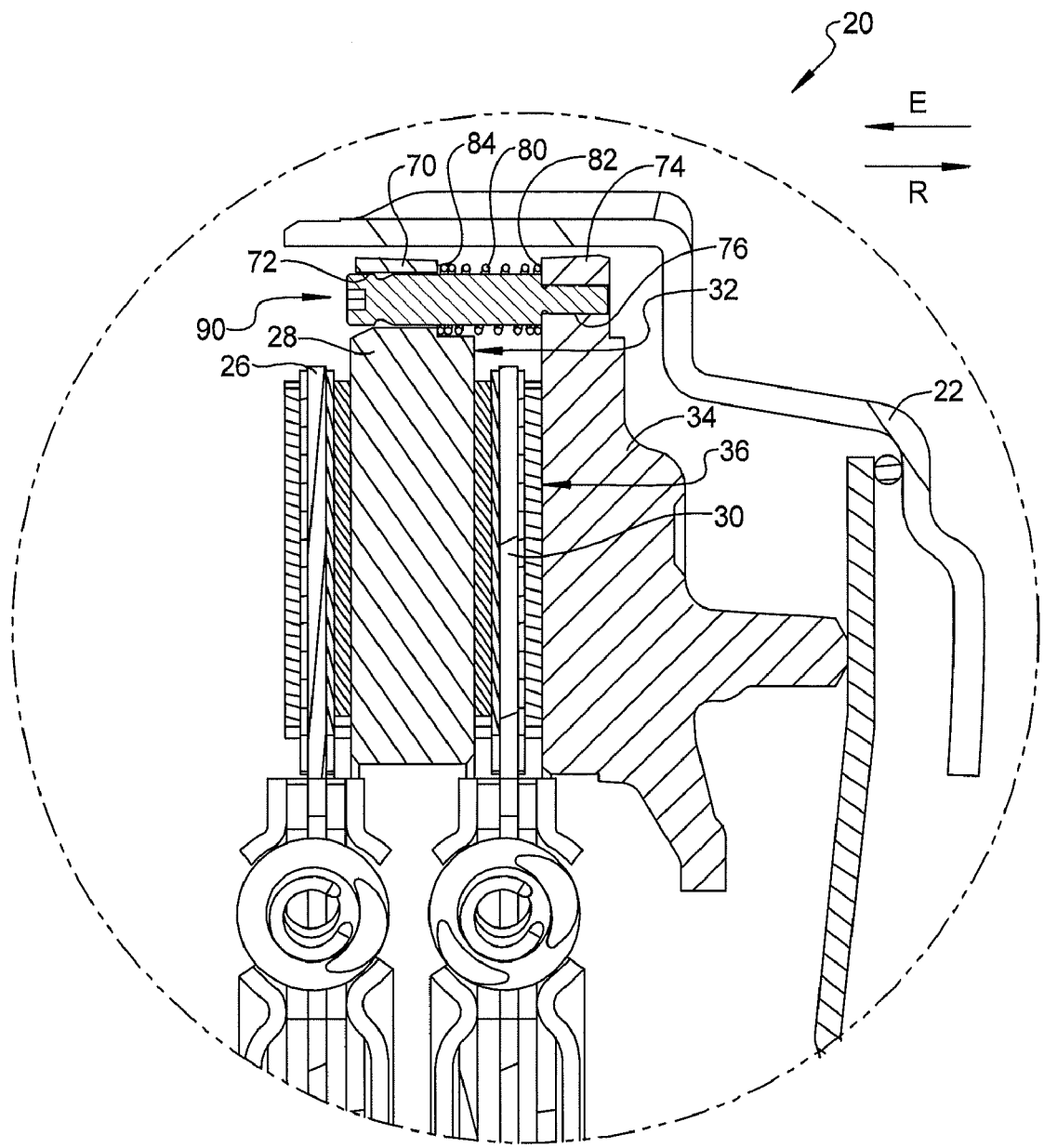
FIG. 7 is an enlarged view of area 7 of FIG. 3, according to an embodiment, with some detail removed for clarity.

Referring to FIGS. 6 and 7, the intermediate plate 28 includes a plurality of intermediate attachment portions 70 having an aperture 72 formed therein, and the pressure plate 34 includes a plurality of pressure attachment portions 74 having an aperture 76 formed therein. A plurality of biasing members 80 are interposed between the intermediate plate 28 and the pressure plate 34. Each biasing member 80 includes a first end 82 that abuts one of the pressure attachment portions 74, and a second end 84 that abuts one of the intermediate attachment portions 70. As illustrated in FIG. 7, when the friction disks 26, 30 contact the flywheel 24, intermediate plate 28, and the pressure plate 34, the biasing members 80 are compressed such that the biasing members 80 exert an axial force (generally parallel to the axis A-A) to urge the pressure plate 34 away from the intermediate plate 28. In the embodiment illustrated, the clutch 20 includes four biasing members 80, although other suitable numbers of biasing members may be used.

Each biasing member 80 includes a first support member 90 interposed therethrough. As illustrated, the first member 90 is slidably interposed through one of the apertures 72 of the intermediate plate 28 and coupled to one of the apertures 76 of the pressure plate 34 to permit the first member 90 to axially translate within the aperture 72 as the intermediate plate 28 moves axially relative to the pressure plate 34. In the embodiment illustrated, the first member 90 is threadably received within the aperture 76, although the first member 90 may be coupled with the pressure plate 34 and the intermediate plate 28 in any suitable manner to retain the biasing element 80 in a desired position while permitting the intermediate plate 28 to move axially relative to the pressure plate 34.

When the clutch 20 is disengaged, that is, when the release assembly 42 is moved away from the pressure plate 34, the pressure plate 34 is urged to move away from the flywheel 24 due to the biasing force of the second drive strap 46. Virtually simultaneously, the intermediate plate 28 automatically moves away from the flywheel 24 due to the biasing force of the first drive strap 44. Due to the biasing force that the biasing member 80 exerts between the pressure plate 34 and the intermediate plate 28, the axial distance the intermediate plate 28 moves is approximately one-half the axial distance the pressure plate 34 moves. In this manner, it is ensured that first and second friction disks 26, 30 are disengaged virtually simultaneously.

It will be appreciated that axial movement of the intermediate plate 28 relative to the pressure plate 34 can be easily modified by altering the spring rates of the biasing member 80, the first drive strap 44, and the second drive strap 46. In the embodiment illustrated, the spring rates of the first drive strap and the biasing member are about equal, although other spring rates may be used, as desired.

Referring to FIGS. 8-12, an alternate exemplary embodiment of the inventive system is shown in detail. In this exemplary approach, a clutch 220 is provided that is substantially similar to the clutch 20 described in the first embodiment with a least one exception, namely, the biasing member may be adjustably preloaded, as discussed in greater detail below.

The clutch 220 includes a cover 222 that is detachably secured to the flywheel 224 of the internal combustion engine E. Between the cover 222 and the flywheel 224 is disposed a first friction disk 226 adjacent the flywheel 224 and an the intermediate plate 228 adjacent the first friction disk 226. A second friction disk 230 is disposed adjacent a transmission-facing side 232 of the intermediate plate 228 and a pressure plate 234 is disposed adjacent a transmission-facing side 236 of second friction disk 230. First and second friction disks 226, 230 are secured for rotation on the transmission input shaft 238, but are axially moveable in relation thereto.

The intermediate plate 228 and the pressure plate 234 are secured for rotation with the cover 222 and, like friction disks 226 and 230, are axially moveable in relation thereto. In the illustrated embodiment, the pressure plate 234 abuts a diaphragm spring 240 that moveably connects the pressure plate 234 to a release mechanism 242. The release mechanism 242 is selectively controlled by a vehicle operator to engage and disengage the clutch 20. However, it will be appreciated that the clutch 220 can be used with a variety of clamp-load generating release mechanisms besides a diaphragm spring. One well known example is the use of a plurality of levers and compression springs. Another illustrative alternative is a centrifugally actuated clutch having both an intermediate plate and a pressure plate. In the centrifugally actuated clutch, the clamping load is generated by pivoted weights, which swing radially outwardly with rotation of the clutch assembly.

Figure 9:
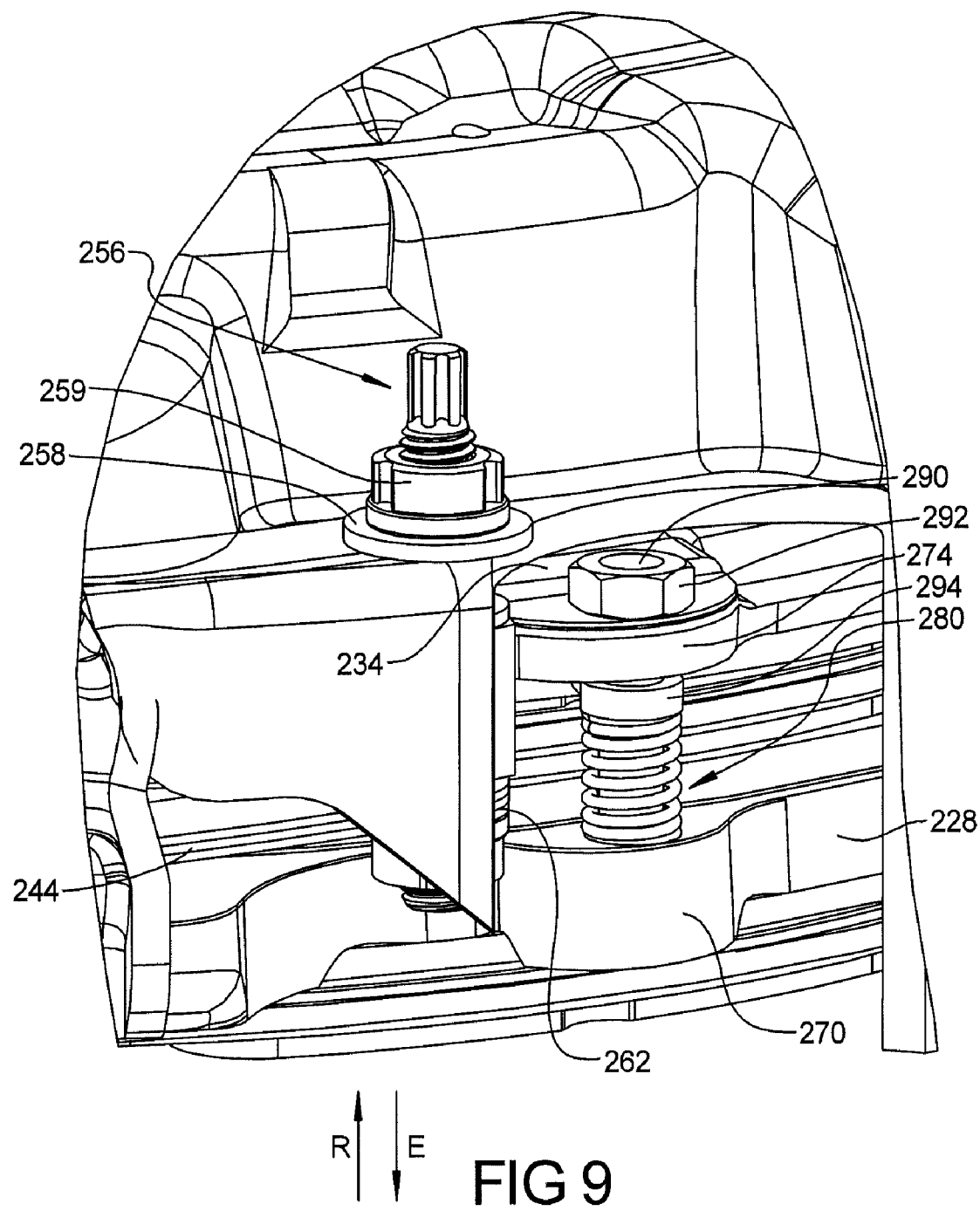
FIG. 9 is an enlarged, partial cut-away perspective view of portion the clutch of FIG. 8, similar to the view of FIG. 6.
Figure 11:
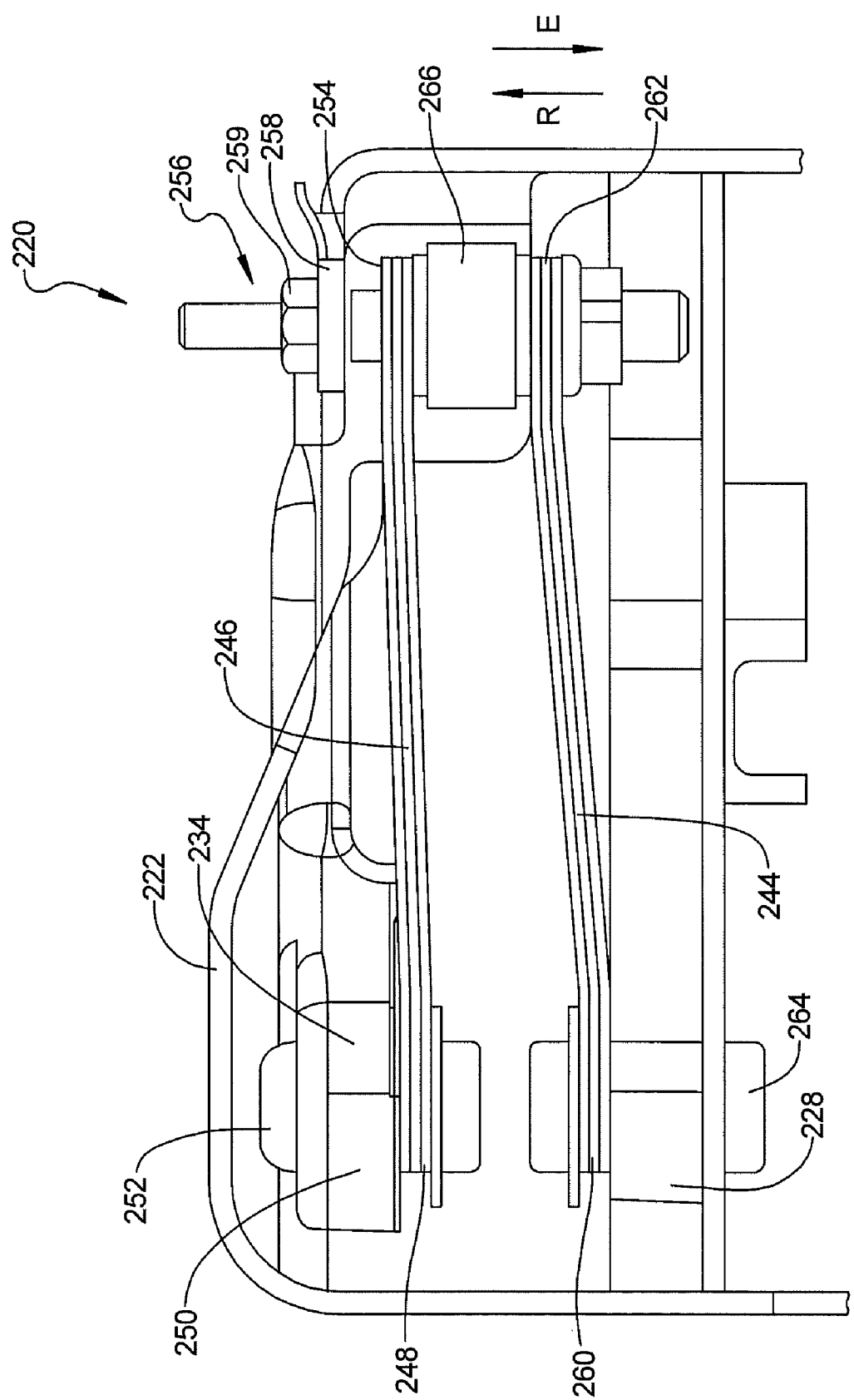
FIG. 11 is a sectional view of the embodiment of FIG. 8, taken generally along line 4-4 of FIG. 2.
Figure 12:
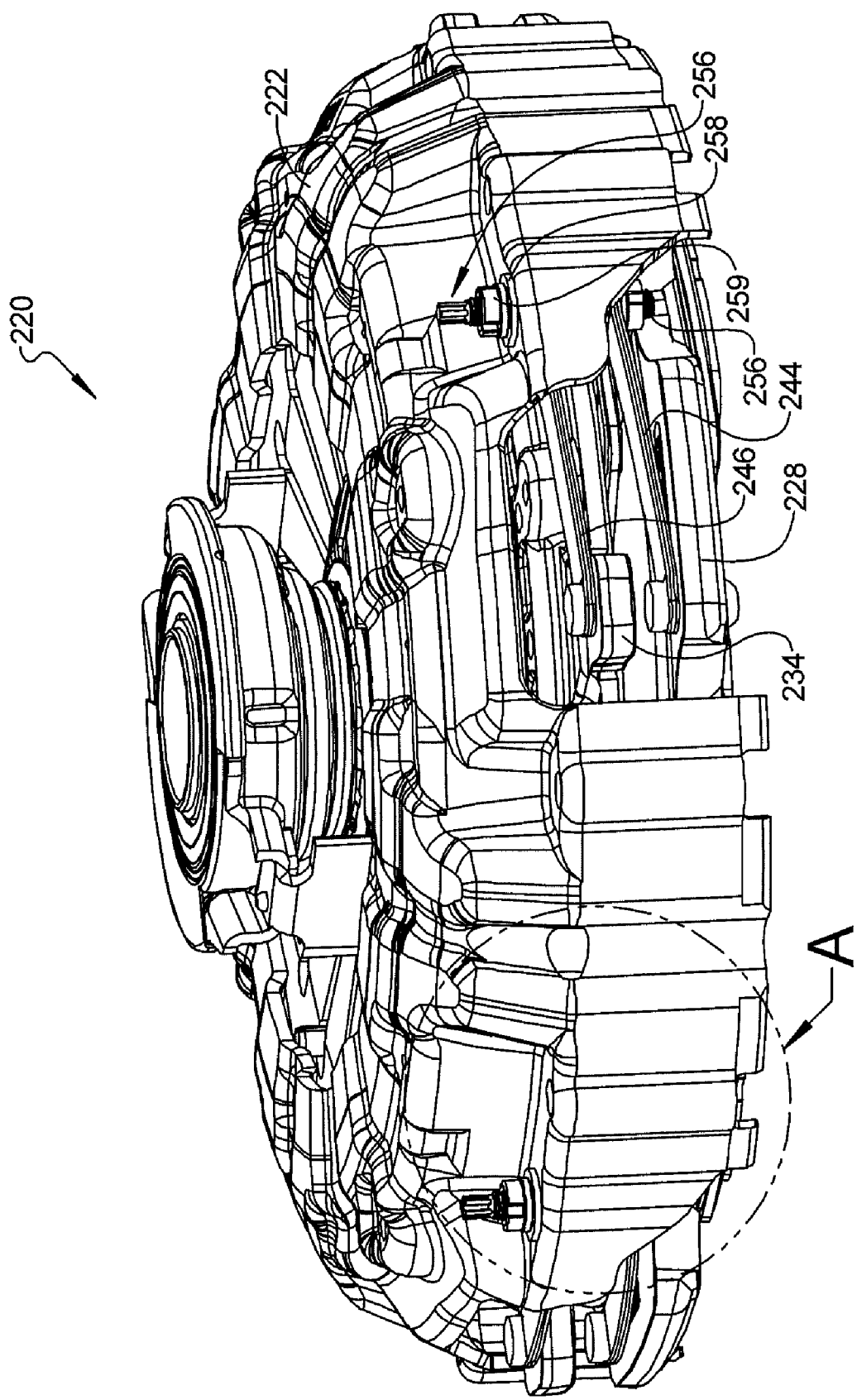
FIG. 12 is a perspective view of the embodiment of FIG. 8, taken generally along the view of line 5-5 of FIG. 2.
Figure 13:
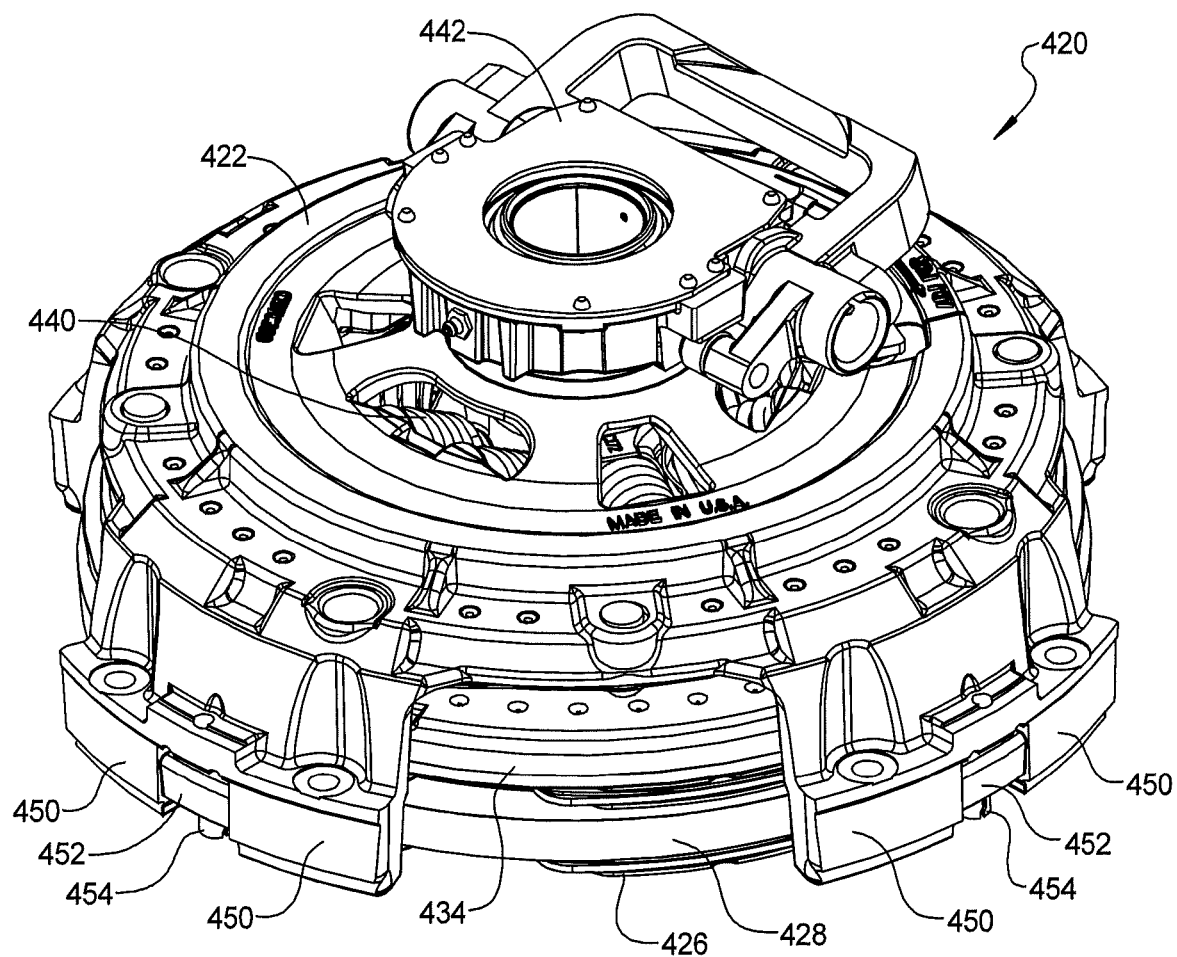
FIG. 13 is a perspective view of another embodiment of a clutch, with some detail removed for clarity.
Figure 14:
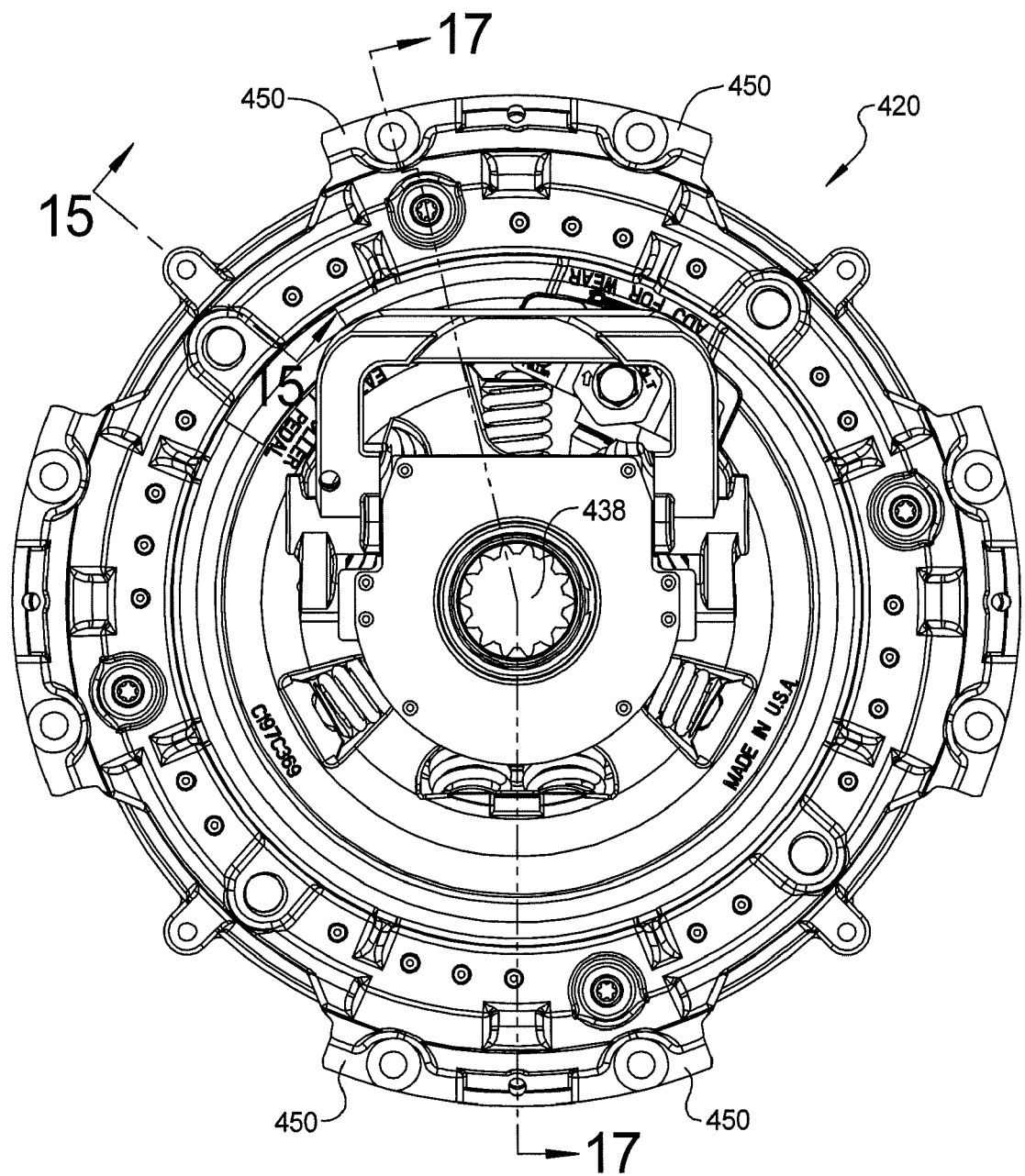
FIG. 14 is an end view of the clutch of FIG. 13.

Referring now specifically to FIGS. 9, 11, and 12, the intermediate plate 228 and the pressure plate 234 are moveably connected to the cover 222 by first and second the drive straps 244 and 246, respectively. The drive straps 244, 246 preferably include a plurality of resilient elements that are layered together to form a leaf spring, as is known. The first drive strap 244 provides a force on the intermediate plate 228 for biasing the intermediate plate 228 in a direction toward the pressure plate 234. Similarly, the second drive strap 246 provides a force against the pressure plate 234 to ensure that the pressure plate 234 is in continuous contact with the diaphragm spring 240. In return, the diaphragm spring 240 applies a clamping force against the pressure plate 234 when engagement of the clutch 220 is desired. While FIGS. 4, 5, and 9 show only one pair of drive straps 244, 246 for each of the intermediate plate 228 and the pressure plate 234, respectively, a plurality of the drive straps 244 and 246 are distributed about the peripheries of the intermediate plate 228 and the pressure plate 234 in the exemplary embodiment illustrated.

Referring again to FIG. 11, a first end 248 of the second drive strap 246 is fixedly secured to a flange portion 250 of the pressure plate 234 by a fastener 252, such as a rivet or the like. A second end 254 of the second drive strap 246 is removably connected to the cover 222 by a drive strap fastener 256, such as a threaded bolt or the like. A washer 258 may be disposed between a head 259 of the fastener 256 and the second drive strap 246 to ensure adequate contact pressure is distributed over second end 254 of the second drive strap 246.

With continuing reference to FIG. 11, a first end 260 of the first drive strap 244 is fixedly secured to the intermediate plate 228 by a fastener 264, such as a rivet or the like, while a second end 262 of the first drive strap 244 is removably connected to the cover 222. In the embodiment illustrated, the first drive strap 244 is preferably attached to the cover 222 by the fastener 256, which may be a threaded bolt or the like. A generally cylindrical sleeve 266 extends between the second end 262 of the first drive strap 244 and the second end 254 of the second drive strap 246. Accordingly, the first drive strap 244 and the second drive strap 246 are fixedly attached to the cover 222 with a single fastener 256, although the first drive strap 244 and the second drive strap 246 may not be fixedly attached to the cover 222 with a single fastener.

Figure 8:
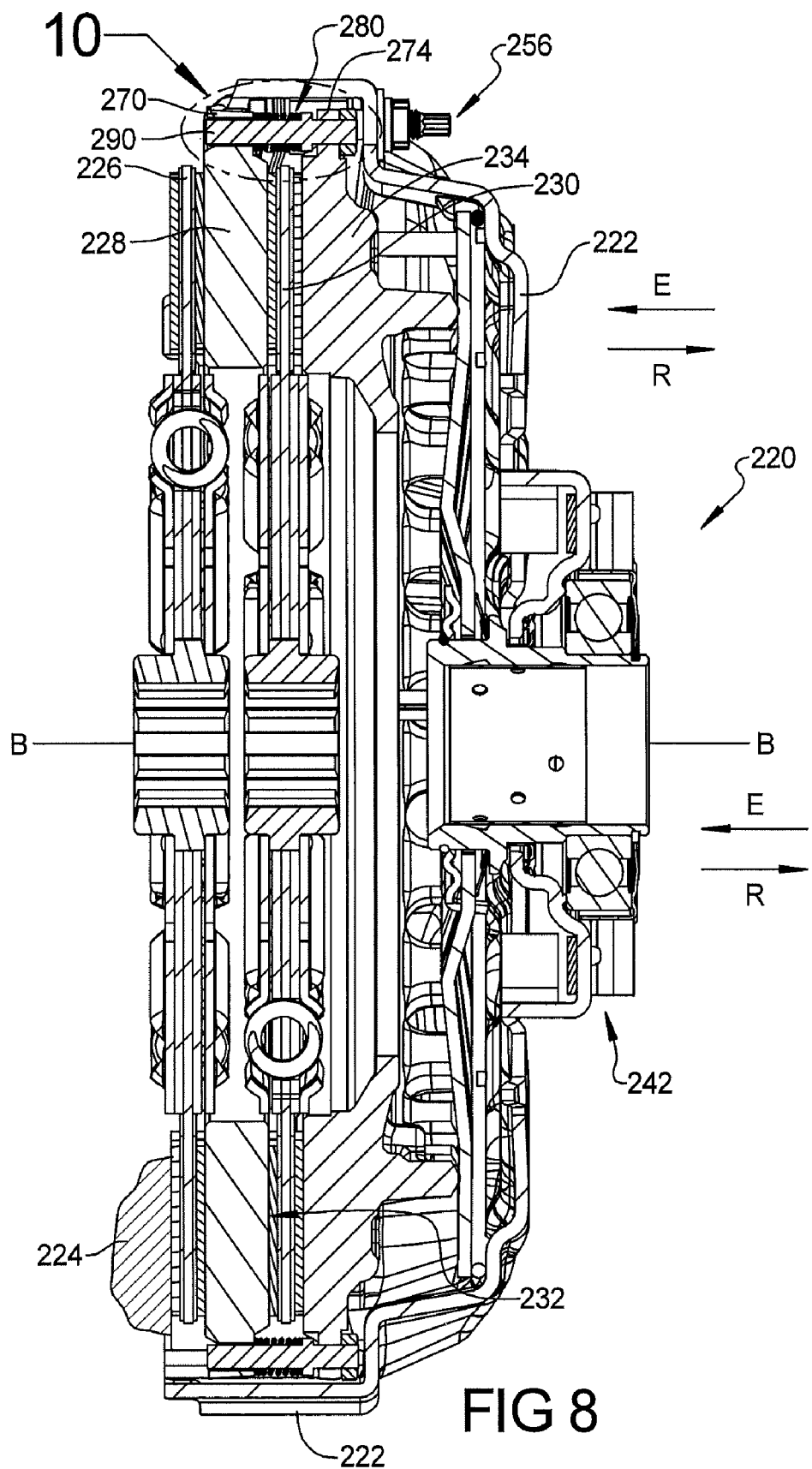
FIG. 8 is a sectional view of the clutch, taken generally along line 3-3 of FIG. 2, according to another embodiment, with some detail removed for clarity.
Figure 10:
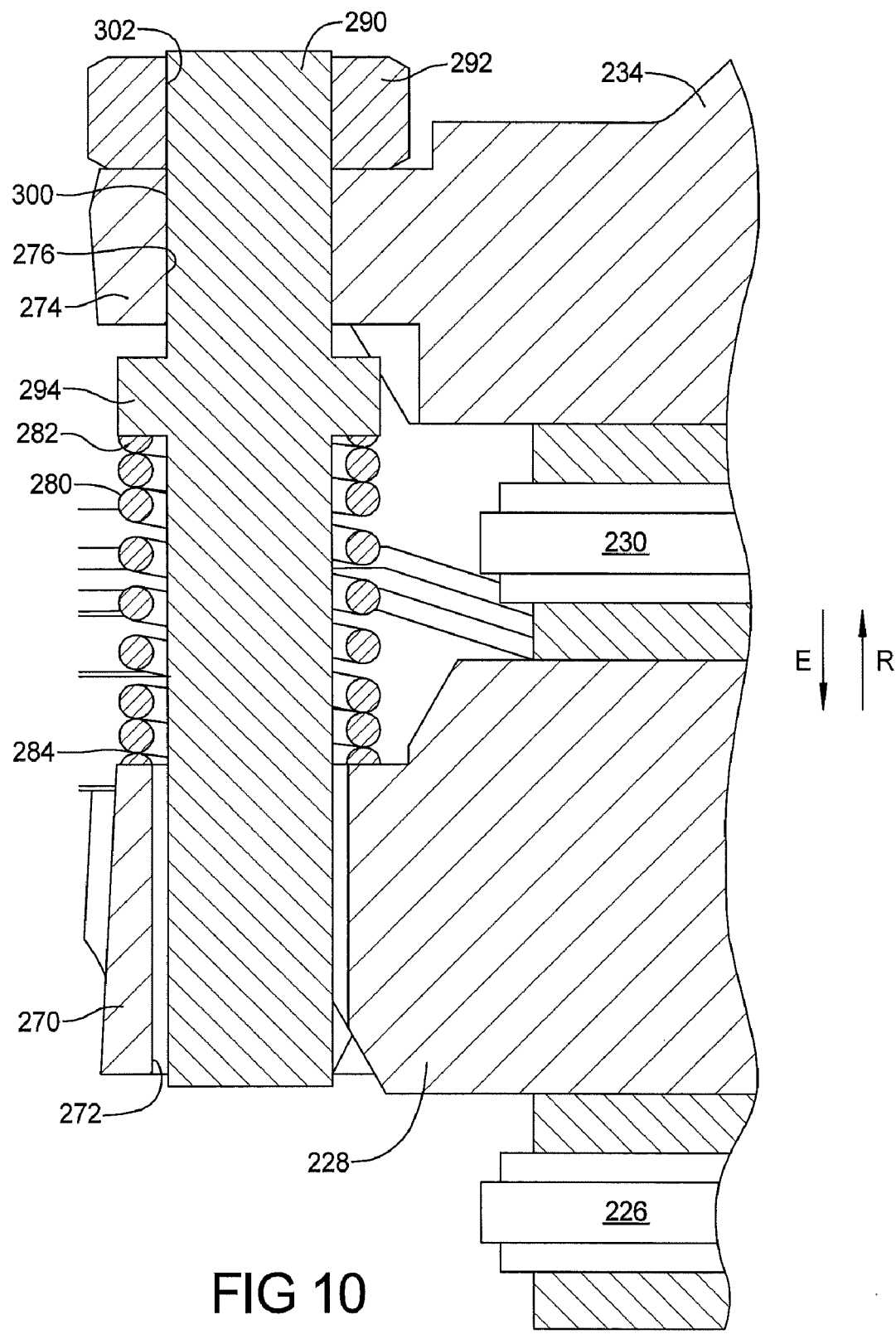
FIG. 10 is an enlarged view of area 10 of FIG. 8, with some detail removed for clarity.

Referring to FIG. 10, the intermediate plate 228 includes a plurality of intermediate attachment portions 270 having an aperture 272 formed therein, and the pressure plate 234 includes a plurality of pressure attachment portions 274 having an aperture 276 formed therein. A plurality of biasing members 280 are interposed between the intermediate plate 228 and the pressure plate 234. Each biasing member 280 includes a first end 282 that abuts one of the pressure attachment portions 274, and a second end 284 that abuts one of the intermediate attachment portions 270. As illustrated in FIG. 8, when the friction disks 226, 230 contact the flywheel 224, intermediate plate 28, and the pressure plate 234, the biasing members 280 are compressed such that the biasing members 280 exert an axial force (generally parallel to the axis B-B) to urge the pressure plate 234 away from the intermediate plate 28. In the embodiment illustrated, the clutch 220 includes four biasing members 280, although other suitable numbers of biasing members may be used.

Each biasing member 280 includes an elongated first member 290 interposed therethrough. The first member 290 has a coupling member 292, such as a threaded nut attached thereto. The first member 290 includes a collar 294 having a larger diameter than the remainder of the first member 290. As illustrated, the first member 290 is slidably interposed through one of the apertures 272 of the intermediate plate 228 and threadably received in one of the apertures 276 of the pressure plate 234 to permit the first member 290 to axially translate within the aperture 272 as the intermediate plate 228 moves axially relative to the pressure plate 234. The first member 290 is threaded to the aperture 276, generally indicated at 300. In the embodiment illustrated, the first member 290 is threadably received within the aperture 276 for adjusting the collar 294 axially relative to the pressure plate 234, although the first member 290 may be coupled with the pressure plate 234 and the intermediate plate 228 in any suitable manner to retain the biasing element 280 in a desired position while permitting the intermediate plate 228 to move axially relative to the pressure plate 234.

As best illustrated in FIG. 10, when the second friction disk 230 is clamped between the pressure plate 234 and the intermediate plate 228, the biasing element 280 is compressed. The threaded engagement between the first member 290 and the pressure plate 234 permits the biasing element to be preloaded when in the configuration of FIG. 10, as desired. Accordingly, a user may increase or decrease the rate of departure between the pressure plate 234 and the intermediate plate 228 by adjusting the first members 290. In one embodiment of adjusting the preload, a user may determine a selected first amount of preload force for the biasing member. After operating for a period of time, if the wear on one of the friction disks 226, 230 exceeds the other, the first members 290 may be rotated relative to the pressure plate 234 to change the axial position of the first members 290 relative to the pressure plate 234, thereby changing the preload on the biasing members 288. This change in preload may result in an increased wear rate on the friction disk that was determined to have the lesser amount of wear as compared to the friction disk that was determined to have the greater amount of wear, thereby increasing the life of the clutch 220. The coupling member 292 may be used to prevent unwanted rotation of the first member 290, as is known.

Although the first members 90, 290 are illustrated with threaded surface portions, the first members 90, 290 may include any surface features for axially restraining at least one of the pressure plate and the intermediate plate relative to the first member. Further, while the first member 290 illustrated with a collar 294 for axially restraining the biasing element 280 relative to the first member, the first member 290 may include any surface feature suitable for axially restraining the biasing element 280 relative to the first member 290.

Referring to FIGS. 13-16, an alternate exemplary embodiment of the inventive system is shown in detail. In this exemplary approach, a clutch 420 is provided that is substantially similar to the clutch 20 described in the first embodiment with a least one exception, namely, the drive straps may not be used. Specifically, the first drive straps 44 may omitted and the intermediate plate coupled for rotation with the cover, flywheel and pressure plate as described herein.

The clutch 420 includes a cover 422 that is detachably secured to a flywheel 424 of an internal combustion engine, such as the internal combustion engine E. Between the cover 422 and the flywheel 424 is disposed a first friction disk 426 adjacent the flywheel 424 and an the intermediate plate 428 adjacent the first friction disk 426. A second friction disk 430 is disposed adjacent a transmission-facing side 432 of the intermediate plate 428 and a pressure plate 434 is disposed adjacent a transmission-facing side 436 of second friction disk 430. First and second friction disks 426, 430 are secured for rotation on a transmission input shaft 438, but are axially moveable in relation thereto.

The intermediate plate 428 and the pressure plate 434 are secured for rotation with the cover 422 and the flywheel 424 and, like friction disks 426 and 430, are axially moveable in relation thereto. In the illustrated embodiment, the pressure plate 434 abuts a diaphragm spring 440 that moveably connects the pressure plate 434 to a release mechanism 442. The release mechanism 442 is selectively controlled by a vehicle operator to engage and disengage the clutch 420. However, it will be appreciated that the clutch 420 can be used with a variety of clamp-load generating release mechanisms besides a diaphragm spring. One well known example is the use of a plurality of levers and compression springs. Another illustrative alternative is a centrifugally actuated clutch having both an intermediate plate and a pressure plate. In the centrifugally actuated clutch, the clamping load is generated by pivoted weights, which swing radially outwardly with rotation of the clutch assembly. As discussed in greater detail below, the flywheel 424 includes a plurality of generally cylindrical apertures 444 for guiding the intermediate plate axially relative to the flywheel 424.

The cover 422 includes a plurality of flywheel attachment portions 450. The intermediate plate 428 includes a plurality of lugs 452 (FIGS. 13 and 16) that are interposed between pairs of the flywheel attachment portions 450 for coupling the intermediate plate 428 for rotation with the cover 422. The lugs 452 include generally tubular alignment members 454 extending therefrom. As best seen in FIG. 17, the intermediate plate 428 is rotatably connected to the cover 222 by a plurality of drive straps 446. The drive straps 446 may include a plurality of resilient elements that are layered together to form a leaf spring, as is known. The drive strap 458 provides a force against the pressure plate 434 to ensure that the pressure plate 434 is in continuous contact with the diaphragm spring 440. In return, the diaphragm spring 440 applies a clamping force against the pressure plate 434 when engagement of the clutch 420 is desired. A plurality of the drive straps 446 are distributed about the peripheries of the intermediate plate 428 and the pressure plate 434 in the exemplary embodiment illustrated.

Referring again to FIG. 17, a first end 460 of the drive strap 458 is fixedly secured to a flange portion 462 of the pressure plate 434 by a fastener 464, such as a rivet or the like. A second end 466 of the drive strap 446 is removably connected to the cover 422 by a drive strap fastener 468, such as a threaded bolt or the like.

Figure 15:
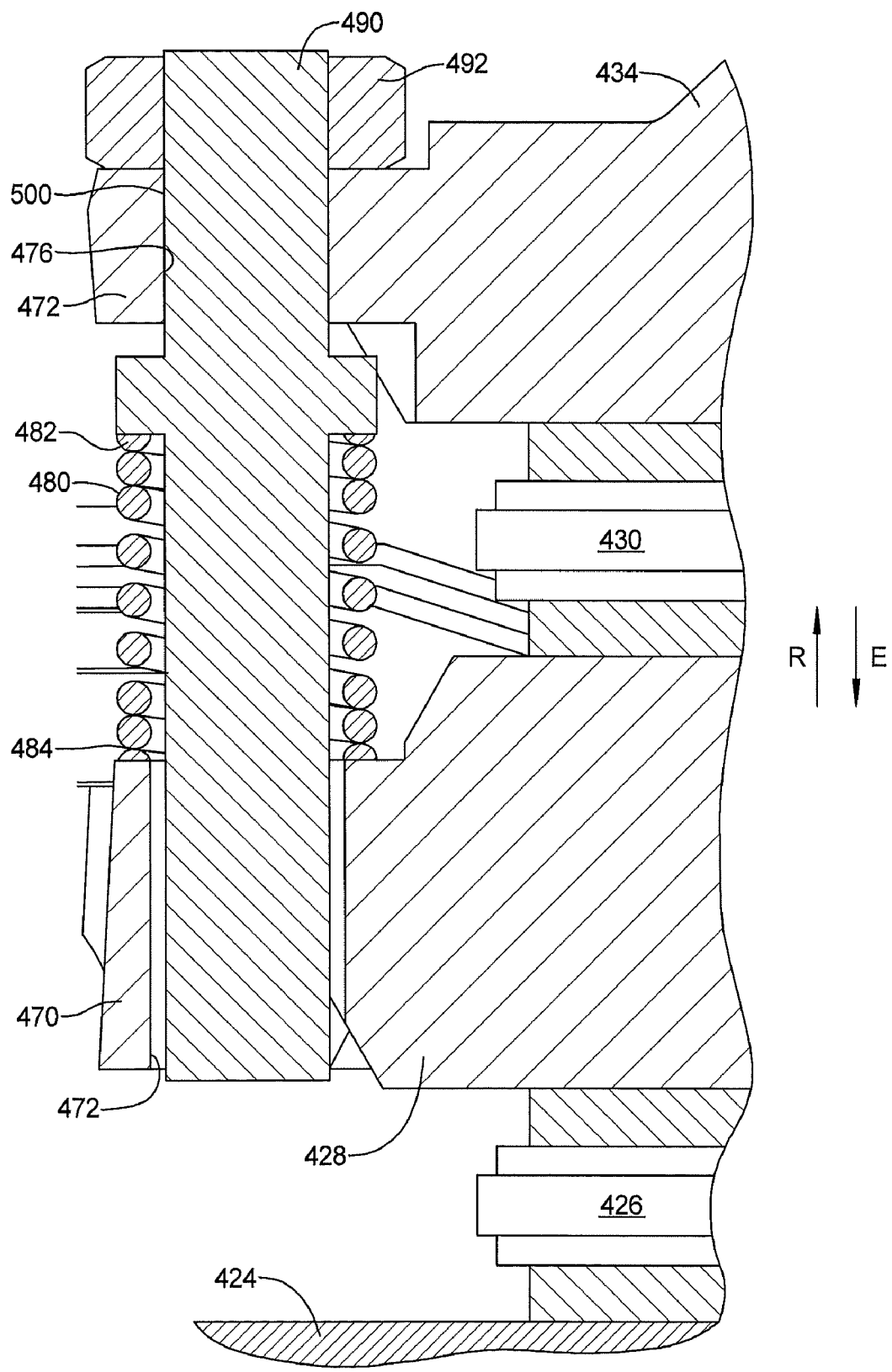
FIG. 15 is a sectional view taken generally along line 15-15 of FIG. 14.
Figure 16:
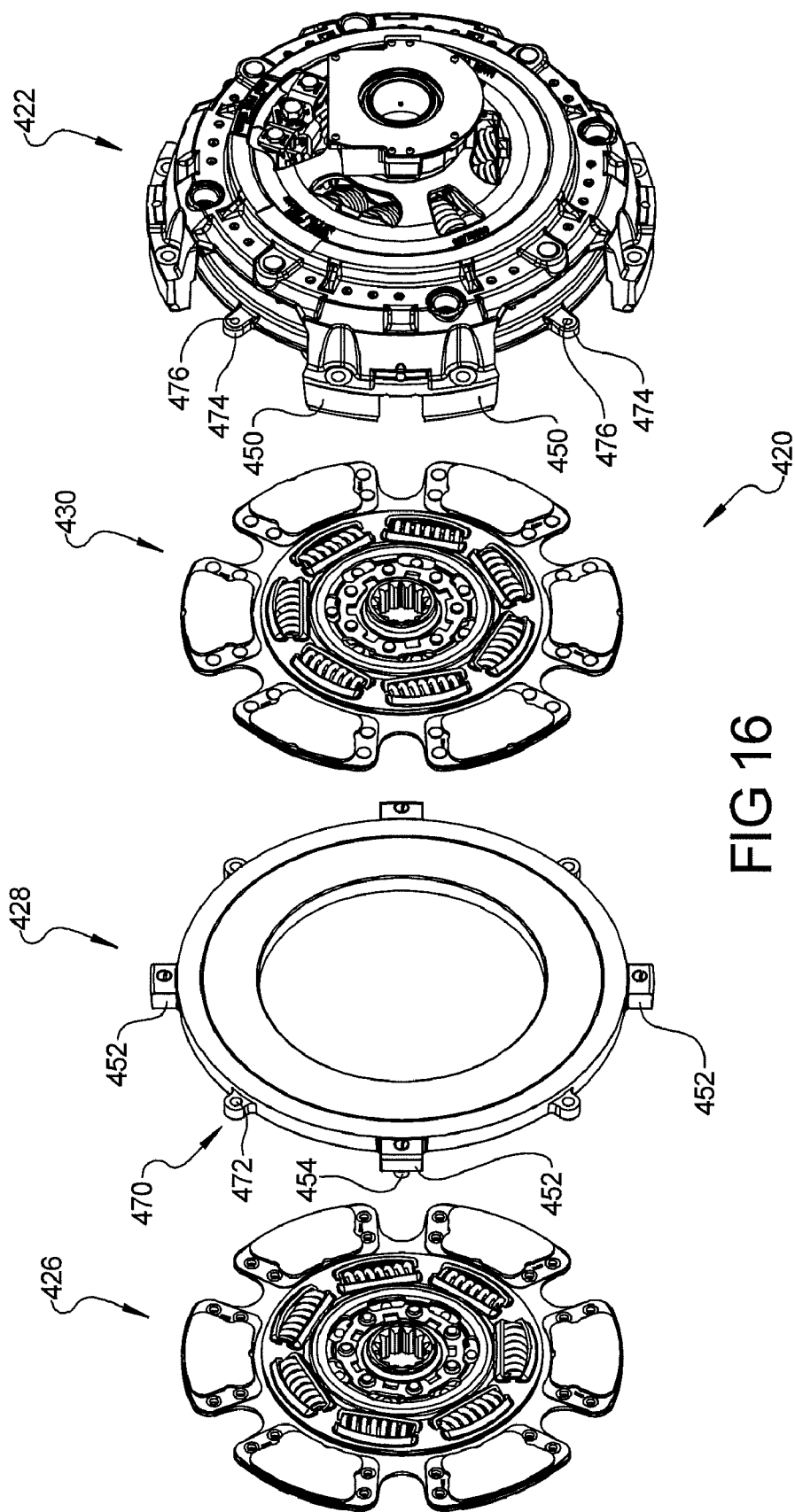
FIG. 16 is an exploded view of the clutch of FIG. 13.
Figure 17:
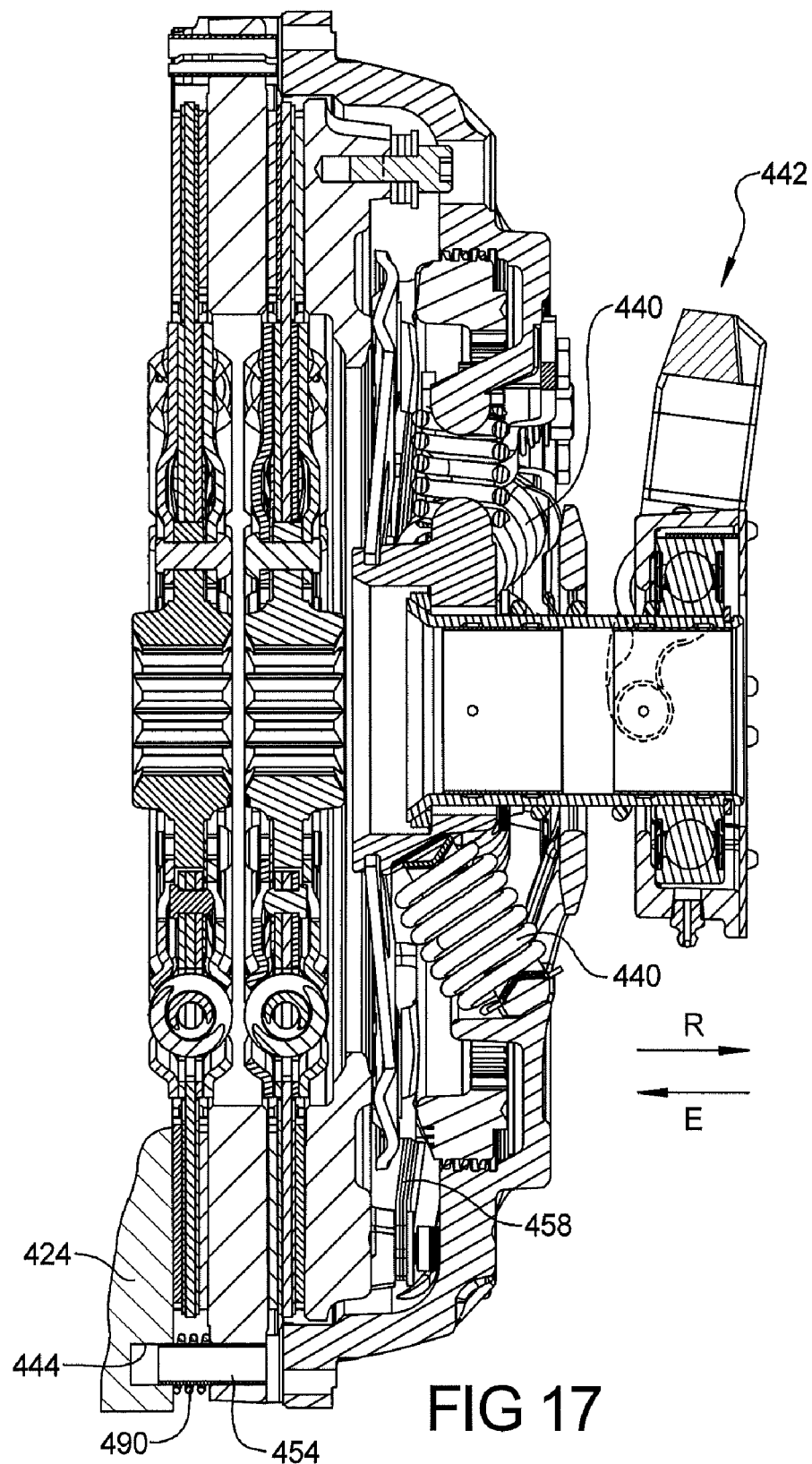
FIG. 17 is a sectional view taken generally along line 17-17 of FIG. 14, where line 17-17 is rotated at the axis of the clutch.

Referring to FIGS. 15 and 16, the intermediate plate 428 includes a plurality of intermediate attachment portions 470 having an aperture 472 formed therein, and the pressure plate 434 includes a plurality of pressure attachment portions 474 having an aperture 476 formed therein. A plurality of biasing members 480 are interposed between the intermediate plate 428 and the pressure plate 434. Each biasing member 480 includes a first end 482 that abuts one of the pressure attachment portions 474, and a second end 484 that abuts one of the intermediate attachment portions 470. When the friction disks 426, 430 contact the flywheel 424, the intermediate plate 428, and the pressure plate 434, the biasing members 480 are compressed such that the biasing members 480 exert an axial force (generally parallel to the axis C-C) to urge the pressure plate 434 away from the intermediate plate 428. In the embodiment illustrated, the clutch 420 includes four biasing members 480, although other suitable numbers of biasing members may be used.

Each biasing member 480 includes an elongated first member 490 interposed therethrough. The first member 490 has a coupling member 492, such as a threaded nut attached thereto. The first member 490 includes a collar 494 having a larger diameter than the remainder of the first member 490. As illustrated, the first member 490 is slidably interposed through one of the apertures 472 of the intermediate plate 428 and threadably received in one of the apertures 476 of the pressure plate 434 to permit the first member 490 to axially translate within the aperture 472 as the intermediate plate 428 moves axially relative to the pressure plate 434. The first member 490 is threaded to the aperture 476, generally indicated at 500. In the embodiment illustrated, the first member 490 is threadably received within the aperture 476 for adjusting the collar 494 axially relative to the pressure plate 434, although the first member 490 may be coupled with the pressure plate 434 and the intermediate plate 428 in any suitable manner to retain the biasing element 480 in a desired position while permitting the intermediate plate 428 to move axially relative to the pressure plate 434.

As best illustrated in FIG. 15, when the second friction disk 430 is clamped between the pressure plate 434 and the intermediate plate 428, the biasing element 480 is compressed. The threaded engagement between the first member 490 and the pressure plate 434 permits the biasing element to be preloaded when in the configuration of FIG. 10, as desired. Accordingly, a user may increase or decrease the rate of departure between the pressure plate 434 and the intermediate plate 428 by adjusting the first members 490. In one embodiment of adjusting the preload, a user may determine a selected first amount of preload force for the biasing member. After operating for a period of time, if the wear on one of the friction disks 426, 430 exceeds the other, the first members 490 may be rotated relative to the pressure plate 434 to change the axial position of the first members 490 relative to the pressure plate 434, thereby changing the preload on the biasing members 488. This change in preload may result in an increased wear rate on the friction disk that was determined to have the lesser amount of wear as compared to the friction disk that was determined to have the greater amount of wear, thereby increasing the life of the clutch 420. The coupling member 492 may be used to prevent unwanted rotation of the first member 490, as is known. Further, the biasing member 488 may not be preloaded.

The alignment members 454 extend into the apertures 444 and are axially moveable relative thereto as the intermediate plate 428 moves axially relative to the flywheel 424. In another embodiment, a plurality of biasing members 490, such as coil springs, may be interposed between the intermediate plate 428 and the flywheel 424 to urge the intermediate plate 428 to move generally in the direction of the arrow R as the pressure plate 434 moves generally in the direction of the arrow R. The combined force of the biasing members 510 of the clutch 420 may be about equal to the combined force of the biasing members 480 to urge the intermediate plate to move about half of the axial distance moved by the pressure plate 434 relative to the flywheel during clutch engagement and disengagement.

Although the steps of operating and assembling the clutches 20, 220, 420 may be listed in an order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A torque transmitting apparatus comprising:
   a cover portion generally defined by a first axis;
   a flywheel coupled to the cover portion for rotation therewith, wherein the flywheel is restrained from axial movement relative to the cover portion
   a pressure plate coupled to the cover portion for rotation therewith, wherein the pressure plate is axially moveable relative to the cover portion;
   an intermediate plate coupled to the cover portion for rotation therewith, wherein the intermediate plate is axially moveable relative to the cover portion and the pressure plate;
   a first clutch disk at least partially interposed between the flywheel and the intermediate plate;
   a second clutch disk at least partially interposed between the pressure plate and the intermediate plate;
   an axially acting biasing element for exerting an axial force between the pressure plate and the intermediate plate;
   a support member extending through the biasing element, the pressure plate, and the intermediate plate;
   a first drive strap interconnecting the pressure plate and the cover; and
   a second drive strap interconnecting the intermediate plate and the cover,
   wherein the first drive strap and the second drive strap are attached to the cover only by a single drive strap fastener.

2. The apparatus of claim 1, wherein the first drive strap extends circumferentially and axially between the pressure plate and the cover for providing a biasing force therebetween.

3. The apparatus of claim 2, wherein the second drive strap extends circumferentially and axially between the intermediate plate and the cover for providing a biasing force therebetween.

4. The apparatus of claim 1, wherein the drive strap fastener is interposed through an aperture in the cover.

5. The apparatus of claim 1, wherein the biasing element is preloaded, at least in part, by the support member.

6. The apparatus of claim 1, wherein the support member includes a first surface portion for axially restraining the biasing element relative to the support member, and a second surface portion for axially restraining at least one of the pressure plate and the intermediate plate relative to the support member.

7. A method of assembling a clutch, comprising:
   interposing a first friction member between a flywheel and an intermediate plate;
   interposing a second friction member between a pressure plate and the intermediate plate;
   positioning a biasing member adjacent the pressure plate and the intermediate plate such that the biasing member will resiliently bias the pressure plate away from the intermediate plate;
   interposing a support member through the biasing member;
   positioning a portion of a first drive strap to the intermediate plate;
   positioning a portion of a second drive strap to the pressure plate; and
   attaching a second portion of the first drive strap and a second portion of the second drive strap to a cover by a single drive strap fastener.

8. The method of claim 7, further comprising adjusting an initial preload force on the biasing member to provide an adjusted preload force.

9. The method of claim 7, further comprising adjustably coupling the support member to one of the pressure plate and the intermediate plate.

10. The method of claim 7, the second drive strap interconnects the intermediate plate and the cover and extends circumferentially and axially between the intermediate plate and the cover for providing a biasing force therebetween.

11. The method of claim 10, the first drive strap interconnects the pressure plate and the cover and extends circumferentially and axially between the pressure plate and the cover for providing a biasing force therebetween.

12. A method of assembling a clutch, comprising:
   interposing a first friction member between a flywheel and an intermediate plate;
   interposing a second friction member between a pressure plate and the intermediate plate;
   positioning a biasing member adjacent the pressure plate and the intermediate plate such that the biasing member will resiliently bias the pressure plate away from the intermediate plate;
   determining a selected first amount of preload force for the biasing member;
   adjusting the preload on the biasing member to provide a second amount of preload force wherein the adjusting comprises at least in part, a selective rotating of a support member.

13. The method of claim 12, further comprising interposing the support member at least partially within the biasing member.

14. The method of claim 12, further comprising a support member interposed within the biasing member and coupled to at least one of the pressure plate and intermediate plate, wherein the support member may be adjusted for axial displacement relative to at least one of the pressure plate and the intermediate plate.

15. The method of claim 12, further comprising coupling a first drive strap to the intermediate plate and a cover, wherein the first drive strap extends circumferentially and axially between the intermediate plate and the cover for providing a biasing force therebetween.

16. The method of claim 15, further comprising coupling a second drive strap to the pressure plate and the cover, wherein the second drive strap extends circumferentially and axially between the pressure plate and the cover for providing a biasing force therebetween, and wherein the first drive strap and the second drive strap are connected to the cover with a single fastener.

17. A torque transmitting apparatus comprising:
a cover portion generally defined by a first axis;
a flywheel coupled to the cover portion for rotation therewith, wherein the flywheel is restrained from axial movement relative to the cover portion
a pressure plate coupled to the cover portion for rotation therewith, wherein the pressure plate is axially moveable relative to the cover portion;
an intermediate plate coupled to the cover portion for rotation therewith, wherein the intermediate plate is axially moveable relative to the cover portion and the pressure plate;
a first clutch disk at least partially interposed between the flywheel and the intermediate plate;
a second clutch disk at least partially interposed between the pressure plate and the intermediate plate;
an axially acting biasing element for exerting an axial force between the pressure plate and the intermediate plate;
a support member extending through the biasing element, the pressure plate, and the intermediate plate;
a first drive strap interconnecting the pressure plate and the cover; and
a second drive strap interconnecting the intermediate plate and the cover,
wherein the first drive strap and the second drive strap are coupled to at least one drive strap fastener, and
where the at least one drive strap fastener is interposed through an aperture in the cover.

* * * * *